US012736376B2

(12) United States Patent
Höhne et al.

(10) Patent No.: US 12,736,376 B2
(45) Date of Patent: Sep. 15, 2026

(54) MODULAR MEASURING CELL FOR MEASURING CHEMICAL AND/OR PHYSICAL PROPERTIES OF A FLUID

(71) Applicant: Endress+Hauser Conducta GmbH+Co. KG, Gerlingen (DE)

(72) Inventors: Thomas Höhne, Chemnitz (DE); Moritz Woischke, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 323 days.

(21) Appl. No.: 18/390,484

(22) Filed: Dec. 20, 2023

(65) Prior Publication Data

US 2024/0210220 A1 Jun. 27, 2024

(30) Foreign Application Priority Data

Dec. 23, 2022 (DE) ..................... 10 2022 134 787.7

(51) Int. Cl.
*G01D 11/24* (2006.01)

(52) U.S. Cl.
CPC .................................... *G01D 11/24* (2013.01)

(58) Field of Classification Search
CPC ........ G01D 11/24; G01D 21/02; G01D 11/00; B01L 2200/026; B01L 2200/028; B01L 2300/0627; C12M 23/44; C12M 41/00; G01N 27/27; G01N 33/48707; G01N 2201/024; G01N 21/05
See application file for complete search history.

(56) References Cited

U.S. PATENT DOCUMENTS

2019/0025239 A1* 1/2019 Robl ...................... G01D 11/24
2020/0173974 A1* 6/2020 Jugert .................... G01N 21/05

FOREIGN PATENT DOCUMENTS

CN 110650797 A * 1/2020 ............. B01J 8/001
DE 20306104 U1 12/2003
DE 102011013001 B4 5/2016
DE 102018132453 A1 6/2020
WO WO-2019243063 A1 * 12/2019 ............ C12M 41/40

* cited by examiner

*Primary Examiner* — Thomas M Hammond, III
(74) *Attorney, Agent, or Firm* — Christopher R. Powers; Endress+Hauser (USA) Holding, Inc.

(57) ABSTRACT

A modular measuring cell for analytical technology includes: two or more successively arranged and interconnected individual modules, wherein the individual modules are each: flow-through measuring cells include a flow channel with a measuring chamber between inflow and outflow openings; include first connecting elements with an axisymmetrical arrangement on outer surfaces; and include at least one opening for the installation of a sensor for measuring chemical and/or physical properties of a fluid flowing through the measuring cell; and an adapter arranged between adjacent individual modules, which adapter includes a fluid-connecting passage opening and connects the flow channels of the successive individual modules to form a main line channel, wherein the adapter includes second connecting elements having an axisymmetrical arrangement, wherein the first and second connecting elements are complementary to each other, wherein the individual modules are connectable to each other by a predetermined number of orientations about the axis of symmetry.

23 Claims, 6 Drawing Sheets

19
18
16
2
20

17

17
18

9
3
15
16
2
18

14
13
5
4
22
21
12

MODULAR MEASURING CELL FOR MEASURING CHEMICAL AND/OR PHYSICAL PROPERTIES OF A FLUID

CROSS-REFERENCE TO RELATED APPLICATION

The present application is related to and claims the priority benefit of German Patent Application No. 10 2022 134 787.7, filed Dec. 23, 2022, the entire contents of which are incorporated herein by reference.

TECHNICAL FIELD

The present disclosure relates to a modular measuring cell with at least two individual modules for measuring chemical and/or physical properties of a fluid and to a measuring system containing the modular measuring cell.

BACKGROUND

DE 102011013001 B4 shows a flow-through cell for measuring several parameters, viz., UV, pH conductivity, and temperature of a measuring fluid. The sensors are integrated into a measuring cell. Two measurement parameters can be measured simultaneously. The measuring cell is designed in such a way that the fluid to be measured passes through at least one bend from the inlet opening to the outlet opening. A disadvantage of this analysis cell is the deflection of the flow medium, which results in the breakup of laminar flow or the formation of turbulent flow and thus increased shear forces acting upon the medium. In systems in the field of bioprocess engineering in which biological cells, especially eukaryotic cells or proteins, are used, this can lead to damage to the cells and/or to denaturation of the proteins, and thus to the formation of protein aggregates. Furthermore, such a flow-through cell does not have a flow profile optimized for a specific sensor.

Another possibility for measuring several measurement parameters in the field of bioprocess analysis is the provision of measuring systems in which several measuring cells, e.g., in which a sensor is installed in a flow-through cell, are connected to one another via fluidic connections such as hoses, which are connected to one another via adapter elements such as hose connectors, Luer lock connections, or tri-clamps. This conventional connection structure has many interfaces, is complex in structure, and thus carries an increased risk of leakage and thus contamination in the field of bioprocessing. Furthermore, the consumption of the measuring fluid and material and space requirements are very high, and there is a risk of incorrect connection of the hose connections. Furthermore, the chemical and/or physical measured variables are recorded with a time offset, and the measurement times may have to be adjusted/calculated at great expense.

SUMMARY

It is therefore an object of the present disclosure to improve a measuring system for the analysis technology of measuring fluids, and in particular in the field of bioprocess technology, in such a way that two or more chemical and/or physical properties can be measured in any order in a modular measuring system. Furthermore, the object is to provide spatial flexibility with regard to the mounting of the sensors perpendicularly to the connection axis of the individual modules. Furthermore, the object of the present disclosure is to connect the individual measuring cells for the analysis of chemical and/or physical properties in such a way that the number of connections to be made by the user is minimized. Furthermore, it is the object of the present disclosure to minimize the required fluid volume for the measurements, to enable a fluid flow optimized to the respective individual measurement parameters or sensor and a measurement of the chemical and/or physical properties without a substantial fluid flow, preferably without a time offset in a fluid flow, as far as possible without turbulence, preferably a fluid flow poor in turbulence or swirls, and further preferably, as far as possible a laminar fluid flow. Laminar flow is a streamline flow, wherein the flow velocity increases with distance from the wall.

According to the present disclosure, these objects are achieved by a modular measuring cell for analysis technology in bioprocess analysis with two or more successively arranged and interconnected individual modules, wherein the individual modules are in each case configured as flow-through measuring cells, which in each case have an inflow and an outflow opening for a fluid, which are assigned to a first and a second outer surface of the individual module, respectively, wherein all individual modules:

include a flow channel with a measuring chamber between the inflow and outflow openings;

have first connecting elements with an axisymmetrical arrangement on the first and second outer surfaces; and are equipped with at least one opening for the installation of a sensor for measuring chemical and/or physical properties of a fluid flowing through the measuring cell, wherein each case a uniform adapter is arranged between two successive individual modules, which adapter has a fluid-connecting passage opening and connects the flow channels of the successive individual modules to form a main line channel, wherein the adapter has first and second opposing outer surfaces, in each case provided with second connecting elements having an axisymmetrical arrangement, wherein the first and second connecting elements are complementary to one another, wherein each individual module can be connected with respect to another adjacent individual module by a predetermined number of orientations for an axis of symmetry about the axis of symmetry.

The advantage of the present disclosure is that of providing a pre-assembled, non-removable, modular measuring cell, with which several identical or different measuring cells can be connected to one another in any order for analyzing chemical and/or physical properties of a fluid flowing through the measuring cell. Furthermore, due to the symmetry of the individual modules along the axis of symmetry, the sensors can assume several orientations in space, wherein the number of possible orientations depends upon the symmetry of the arrangement of the connecting elements between the receiving indentations of an individual module and the connecting means of the adapter. Such combination options enable optimal adaptation of the sensor system to different environmental conditions and individual requirements with regard to the measurement parameters to be measured.

The structure may be designed for single use and is particularly suitable for inline monitoring or measurement of parameters such as pH, turbidity, absorption of electromagnetic waves, e.g., with wavelengths in the UV, IR, and/or visible range, conductivity, pressure, temperature, oxygen, carbon dioxide, and/or glucose in a hygienic process line in the field of bioprocess analytics in manufacturing (upstream processing) and/or purification processes (downstream processing) in biotechnology or the pharmaceutical industry in the field of biopharmaceuticals.

In a first embodiment, the first outer surface of the individual module at the inflow-side end of the main line channel can be connected to a first port, and the second outer surface of the individual module at the outflow-side end of the main line channel can be connected to a second port in at least a liquid-tight manner, and preferably in a liquid-tight and gas-tight manner, wherein the first and second ports in each case:

have a first or second port element, which is of the same or different configuration; and have a uniform base element having a base surface which faces an outer surface of one of the individual modules and has third connecting elements with an axially symmetric arrangement, wherein the first connecting elements of the individual module and the third connecting elements of the base surface are complementary to one another.

In one embodiment, the first or second port element is selected from any suitable fitting, and preferably a tubing connection—for example, a hose nipple, a clamp connection, and a Luer lock adapter.

In one embodiment, the connection between two individual modules connected via the adapter and/or between an individual module and a port element is non-detachable and form-fitting. In all embodiments, the connection between the individual module and an adapter is configured to be at least liquid-tight, and preferably gas-tight and liquid-tight.

In one embodiment, the modular measuring cell is configured to be gap-free, cleanable, sterilizable, and drainable.

In one embodiment, the individual modules are in each case connected to the adapter and/or the port via:

(a) a form-fitting axial latching about the longitudinal axis of the measuring cell, which is provided via one or more latching elements;

(b) a fixation that is provided via the first connecting elements with the second or third connecting elements; and/or (c) an adhesive bond or a material connection by means of laser welding.

The first, second, and third connecting elements are to be understood as receiving indentations or as vertically attached elevations on an outer surface of an individual module, an adapter, or a port, which are uniformly configured on the outer surface to be attached. The receiving indentations and the vertically attached elevations are always configured to complement one another. The connecting elements on the first and second outer surfaces of an individual module or an adapter can have connecting elements that are identical or complementary to one another. Preferably, the connecting elements are configured to be identical on both outer surfaces on an individual module or on an adapter.

In one embodiment, the connecting elements, which are configured as vertically attached elevations, are designed as pins, bolts, or cuboid bodies.

In one embodiment, the pins, bolts, or cuboid bodies have latching elements for fixing to the complementary receiving indentations.

In one embodiment, the axial latching between an individual module with an adapter or port is provided via latching lugs arranged axially about the longitudinal axis of the measuring cell, which latching lugs are arranged on the surface of an adapter or a port opposite an individual module in each case, wherein the latching lugs latch radially from the outside into a circular axial recess, which in each case is assigned to a respective outer surface of an individual element. In an alternative embodiment, the latching lugs are assigned to an outer surface of an individual module, and the axial recesses are assigned to an outer surface of an adapter or port.

In one embodiment, a sealing region, which is hygienically designed, is arranged between two individual modules connected via an adapter or between an individual module and a port. A sealing element is attached in the sealing region. In one embodiment, the individual modules in each case have a fastening element, such as a flange, arranged around the opening at the inlet and outlet openings or ports at the base surface opposite the individual module. The sealing element seals the outer surface of the fastening element of an individual module with the outer surface of the fastening element of an adjacent individual module or port axially with one another, wherein the sealing element is a sealing ring, and preferably an O-ring. In one embodiment, the sealing element can be part of an adapter or port that is configured as a 2-component, 3-component, or multi-component injection-molded part. In an alternative embodiment, a sealing element can be present individually, positioned radially by an adapter, and compressed during assembly of the adjacent individual module.

In one embodiment, the measuring cell is:

mounted indirectly by means of a latching or clamping of the entire measuring cell or the individual modules, in each case connected to one another via adapters, to a mounting element, which extends over the longitudinal axis of the measuring cell, wherein the mounting element is mounted on a base support;

or mounted directly by direct screwing in, indirect screwing in (adapter/overlap), latching (shaped element, retaining ring), or material bonding, wherein the mounting is provided via external surfaces of the individual modules, adapters, and/or ports, which are not assigned to a sensor or a flow-through opening.

In one embodiment, the axis of symmetry is the longitudinal axis of the main line channel, the longitudinal axis of the measuring cell, or a median of an outer surface of the individual module or adapter.

In one embodiment, the median of an outer surface of the individual module, adapter, or port is a mirror axis.

In one embodiment, the longitudinal axis of the main line channel or the longitudinal axis of the measuring cell is an axis of rotation, and preferably a 2-fold, 3-fold, 4-fold, 5-fold, 6-fold, or 8-fold axis of rotation.

In one embodiment, the axis of rotation is a 4-fold axis of rotation, wherein two individual modules, which can be connected via an adapter, in each case can be oriented relative to one another by four positions, in each case offset by 90°.

In one embodiment, the overall outer surface of the individual modules is designed to be cube-like or cuboid-like—preferably substantially as a cube or cuboid, and further preferably as a cube or cuboid.

In one embodiment, two, three, four, five, or six, and preferably three, individual modules measuring the same or different, and preferably different, chemical and/or physical property can be connected to one another.

In one embodiment, the individual modules can be connected to one another in any order.

In one embodiment, the first and second outer surfaces of the individual modules are arranged opposite one another, wherein preferably the first and second outer surfaces are configured to be identical.

In one embodiment, the first and second outer surfaces of the adapter are oppositely arranged, wherein preferably the first and second outer surfaces are configured to be identical.

In one embodiment, the sensor is selected from an ion-sensitive sensor, and in particular a pH sensor, conductivity sensor, turbidity sensor, temperature sensor, oxygen sensor, a sensor for measuring the absorption of electromagnetic waves in the medium, e.g., with wavelengths in the UV, IR, and/or visible range, flow-through sensor, and pressure sensor.

In one embodiment, the sensor is selected from a pH sensor, conductivity sensor, pressure sensor, temperature sensor, and an optical sensor.

In one embodiment, the sensor is selected from a pH sensor, a conductivity sensor, and an optical sensor.

The optical sensor is preferably a glucose sensor, $CO_2$ sensor, UV sensor, near-infrared sensor, or oxygen sensor—preferably a UV sensor or oxygen sensor, and further preferably a UV sensor.

In one embodiment, the conductivity sensor is designed to measure the permittivity of a measuring fluid in which cells are located.

In one embodiment, the sensor can be arranged at an angle between 30° and 150°, preferably between 80° and 100°, and further preferably perpendicularly to the longitudinal axis of the flow channel of the individual module.

In one embodiment, the sensor is connected to the individual module by direct screwing in, indirect screwing in (adapter/overlap), latching (shaped element, retaining ring), or material fixing, wherein preferably the connection cannot be removed.

Depending upon the type of sensor, this is installed on an individual module via one opening, e.g., a pH sensor, conductivity sensor or optical, oxygen sensor, or via two openings arranged on opposite sides of an individual module—for example, a UV sensor.

In one embodiment, the individual modules, adapters, ports, and sealing elements for single use are configured predominantly, preferably substantially entirely, of plastic, further preferably of a radiation-resistant and/or hot steam-sterilizable plastic, and still further preferably of a biocompatible, radiation-resistant, and/or hot steam-sterilizable plastic.

In all embodiments, all plastics used in the measuring cell are preferably selected from biocompatible plastic materials that do not negatively affect the quality of the product produced by the bioprocessing technique—for example, selected from high-density polyethylene (HDPE), polyetheretherketone (PEEK), polysulfone (PSU), polyphenylsulfone, (PPSU), polyethersulfone (PESU), cycloolefin copolymer (COC), polyethyleneimine (PEI), or polybenzimidazole (PBI). Preferably, the plastic is a USP Class VI-certified plastic. For example, it is a high-density polyethylene (HDPE) with USP Class VI certification.

Furthermore, in one embodiment, the one or more adapters are in each case equipped with a filter unit, which is arranged in the region of the fluid-connecting passage opening, and preferably upstream and/or downstream of the fluid-connecting passage opening. Fluid filters are used for fluids that are largely, and preferably completely, cell-free. The filter or filters are, for example, sterilizing filters, which preferably have a pore size of 0.1 μm. The filter unit can be singular and inserted into the adapter or can be manufactured with the adapter as a 2-component, 3-component, or multicomponent molding or joining method, and preferably a multicomponent injection-molding or multicomponent welding method. In a further embodiment, the adapter comprises a sensor for measuring temperature, conductivity, or flow-through rates installed in the adapter, wherein the sensor is installed perpendicularly to the longitudinal axis of the flow channel of the adapter in a non-removable manner.

Further disclosed is a measuring system according to the present disclosure for analyzing chemical and/or physical properties of a fluid, wherein the measuring system has:

- a modular measuring cell according to one embodiment, and
- at least two sensors for analyzing the same or different chemical and/or physical properties of a fluid, wherein each sensor is selected in each case from an ion-sensitive sensor, in particular a pH sensor, conductivity sensor, turbidity sensor, temperature sensor, oxygen sensor, a sensor for measuring the absorption of electromagnetic waves in the medium, e.g., with wavelengths in the UV, IR, and/or visible range, flow-through sensor, and pressure sensor, preferably a pH sensor, a conductivity sensor, pressure sensor, temperature sensor, and an optical sensor.

In one embodiment, the sensors of the measuring system are selected from a pH sensor, a conductivity sensor, and an optical sensor.

The optical sensor is preferably a glucose sensor, $CO_2$ sensor, UV sensor, near-infrared sensor, or oxygen sensor—preferably a UV sensor or oxygen sensor, and further preferably a UV sensor.

In one embodiment, the sensors of the measuring system are configured as disposable sensors or reusable sensors, and preferably as disposable sensors, wherein the sensors are configured to be radiation-resistant, chemically sterilizable or germ-reducible, and hot steam sterilizable. In all embodiments, the measuring system is biocompatible and does not negatively affect the quality of the biotechnologically produced product.

The radiation is to be understood as radiation that is suitable for sterilization or disinfection of the measuring cell and/or measuring system according to the present disclosure. Preferably, it is X-ray radiation, gamma radiation, or electron beam treatment. Chemical sterilization or disinfection uses ethylene oxide or hydrogen peroxide.

In one embodiment, the measuring system can be combined with other measuring systems from bioprocess technology, selected for example from UV/VIS spectroscopes, FTIR spectroscopes, and Raman spectroscopes.

In one embodiment, the individual modules of the measuring system are in each case identified by a color code, a barcode, or an RFID code for sensor-specific data.

In one embodiment, the modular system or the measuring system is equipped with electrical interface means that enable communication and/or a power supply, i.e., the transmission and reception of data, with an external electrical evaluation device, wherein an interface is assigned to each installed sensor. Communication can take place via cable connections or via radio networks.

The electrical interface means allow electrical connection of the sensors to an external electronic control device that is capable of processing the generated sensor signals.

In one embodiment, the measuring system comprises a microcontroller.

All the modular systems and the measuring systems described above can be combined with each other in each case, provided that this is technically possible.

BRIEF DESCRIPTION OF THE DRAWINGS

The present disclosure is explained in more detail in the following description with reference to the exemplary embodiments shown in the drawings.

DETAILED DESCRIPTION

Figure 1:
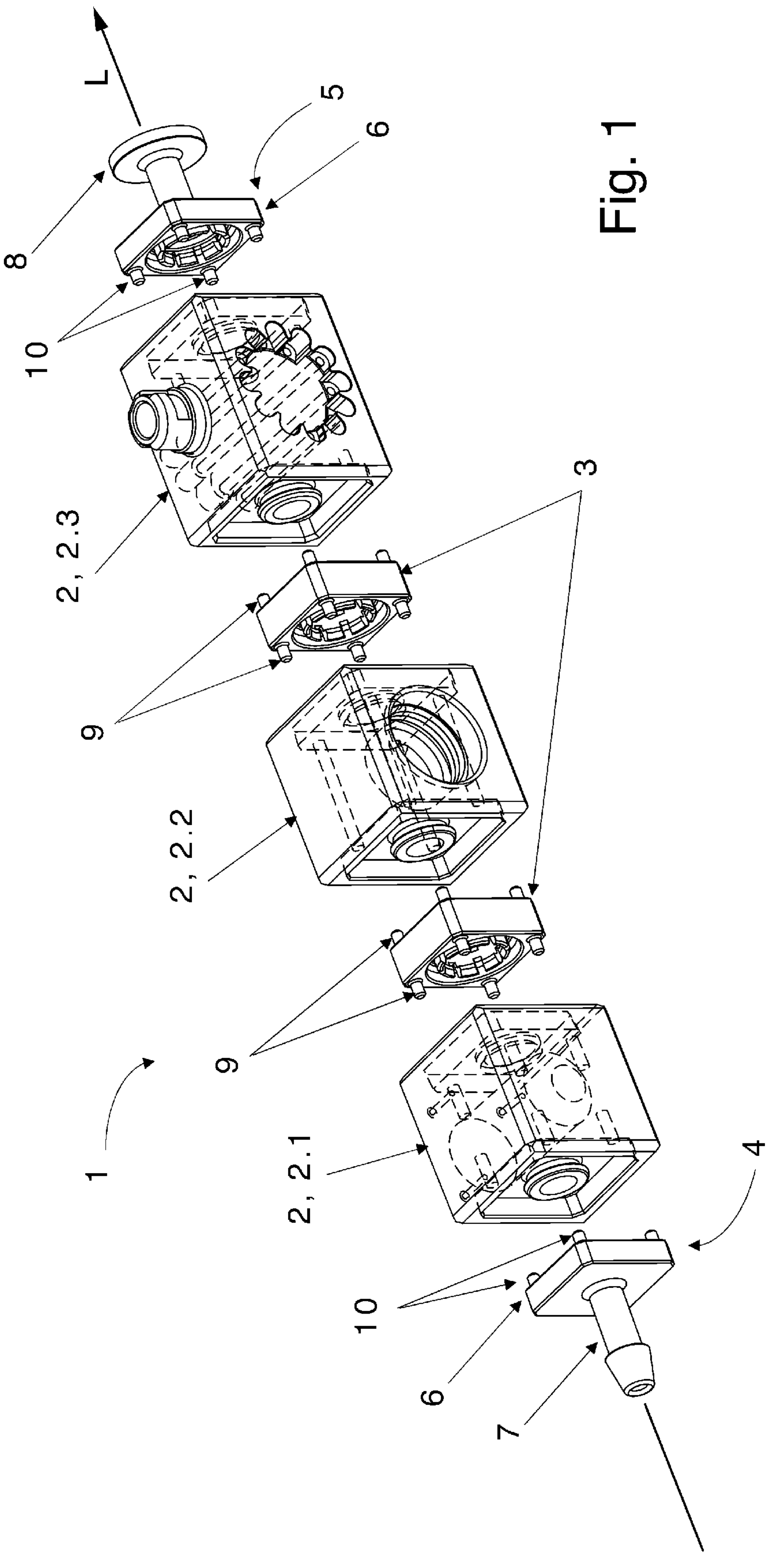
FIG. 1 shows an exploded perspective view of an embodiment of the modular measuring cell according to the present disclosure.

FIG. 1 shows a modular measuring cell 1 that has three individual modules 2, labeled 2.1, 2.2 and 2.3, respectively, that are connected to one another in pairs via an adapter 3, and wherein the two outer individual modules 2.1 and 2.3 can in each case be connected to a first port 4 or a second port 5, wherein the first port 4 and the second port 5 in each case consist of a base body 6 and a first port element 7 or a second port element 8. Furthermore, rotationally symmetric second connecting elements 9 of the adapters 3 and the third connecting elements 10 of the ports 4, 5 are shown, which in each case can be connected to the receiving indentations of the individual modules 2 in a rotationally symmetric manner along the flow axis of the measuring fluid.

Figure 2:
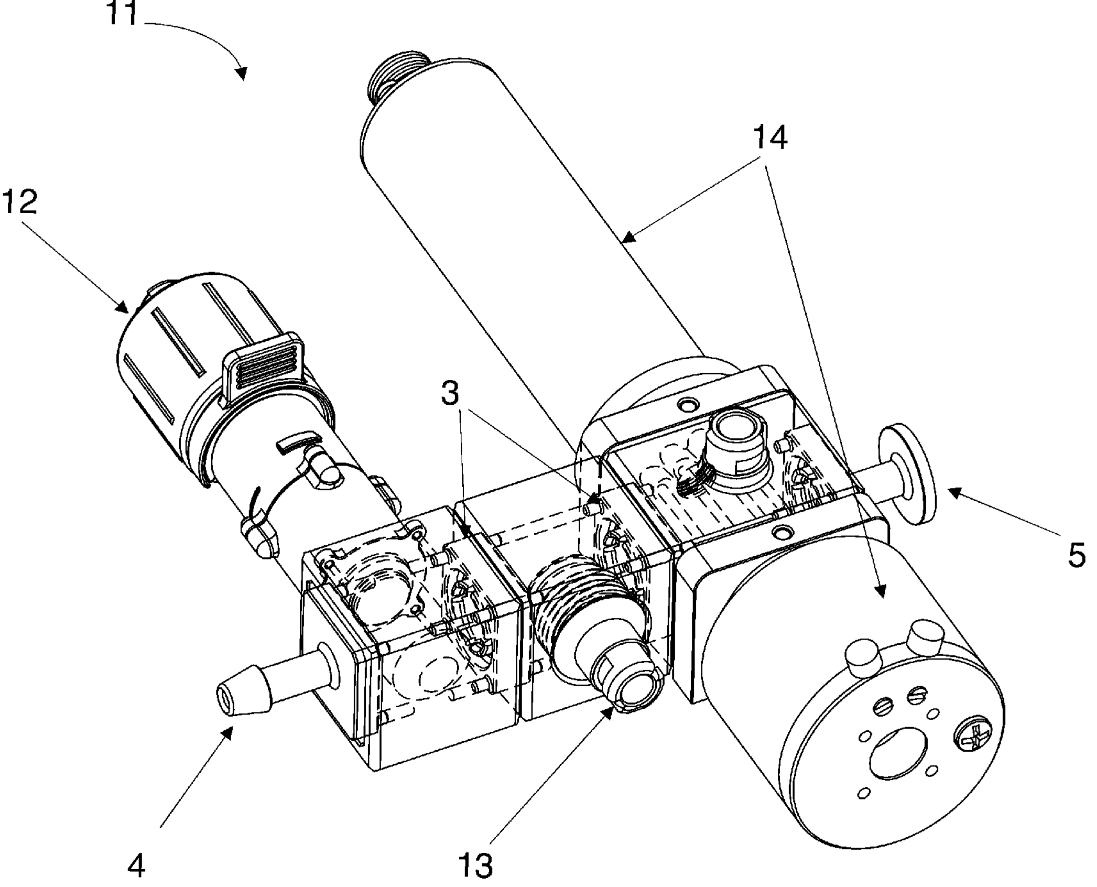
FIG. 2 shows a perspective view of an assembly representation of an embodiment of the modular measuring system according to the present disclosure containing an embodiment of the modular measuring cell with a pH sensor, a conductivity sensor, and a UV sensor.

FIG. 2 shows a modular measuring system 11, which comprises the modular measuring cell 1 along with a pH sensor 12, a conductivity sensor 13, and a UV sensor 14.

Figures 3A, 3B, 3C, 3D:
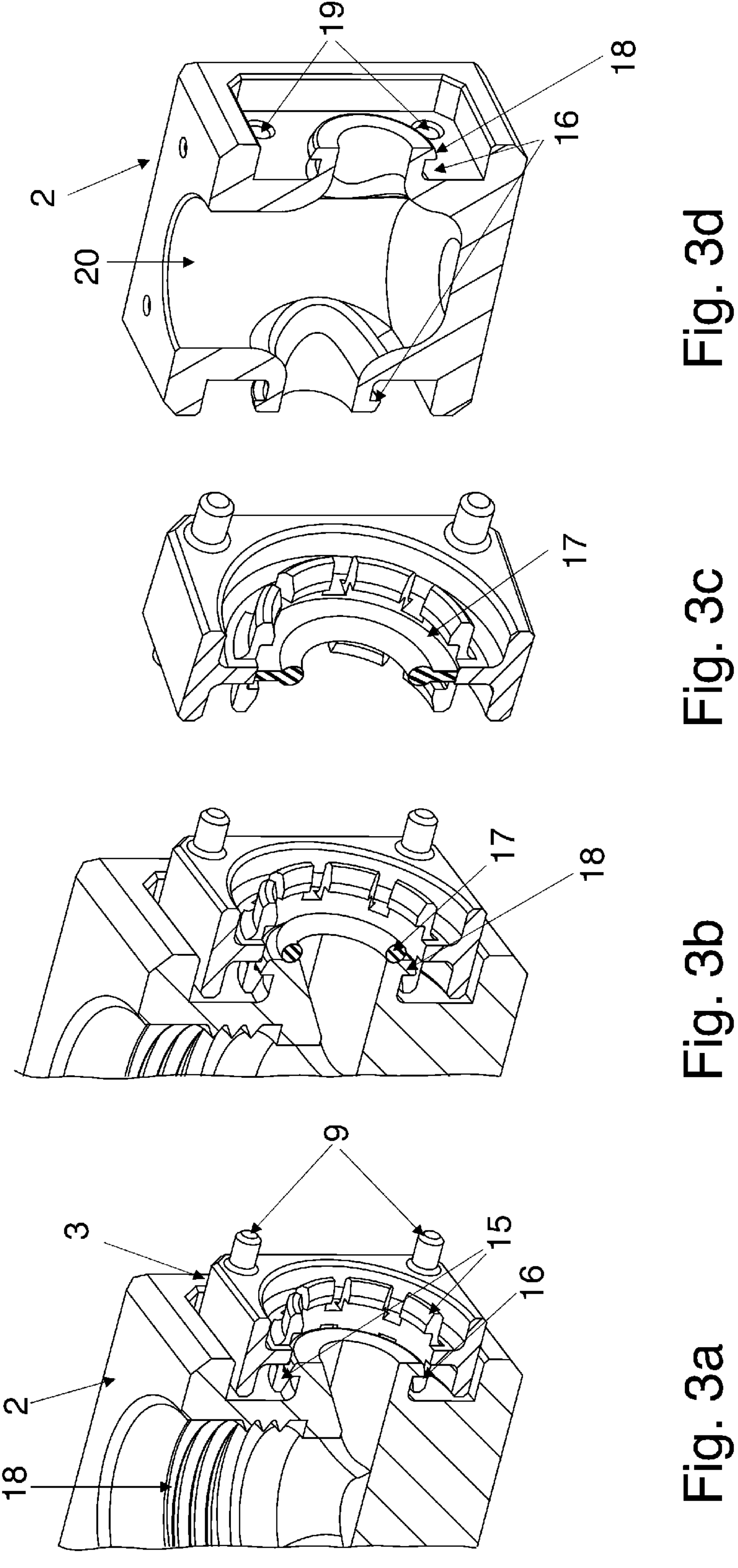
FIGS. 3*a*-3*d* show partial, sectional detailed views of a sealing region between an individual module and an adapter of an embodiment of the modular measuring cell.

FIG. 3*a* shows a sealing region between an individual module 2 and an adapter 3. Latching lugs 15 on the adapter 3, which are arranged on the side opposite the individual module, engage in an axial recess 16 on the opposite individual module 2. FIG. 3*a* also shows latching lugs 15 and pins as second connecting elements 9 on the outer surface of the adapter 2, which is not connected to the individual module. FIG. 3*b* shows the sealing region according to an embodiment between an individual module 2 and an adapter 3, as in FIG. 3*a*, including a sealing element 17, which rests (e.g., seats) on a flange 18 of the individual module 2. FIG. 3*c* shows a sectional representation of a three-dimensional representation of an adapter 2 according to an embodiment in which the adapter 2 with a sealing element 17 is configured as a one-piece two-component, three-component, or multi-component injection-molded part. FIG. 3*d* shows, in a sectional representation of a three-dimensional representation of half of an individual module 2, axial recesses 16 and symmetrically arranged first connecting elements 19, which are configured as receiving indentations that are configured to be complementary to second connecting elements or pins 9 of an adjacent adapter.

Figure 4:
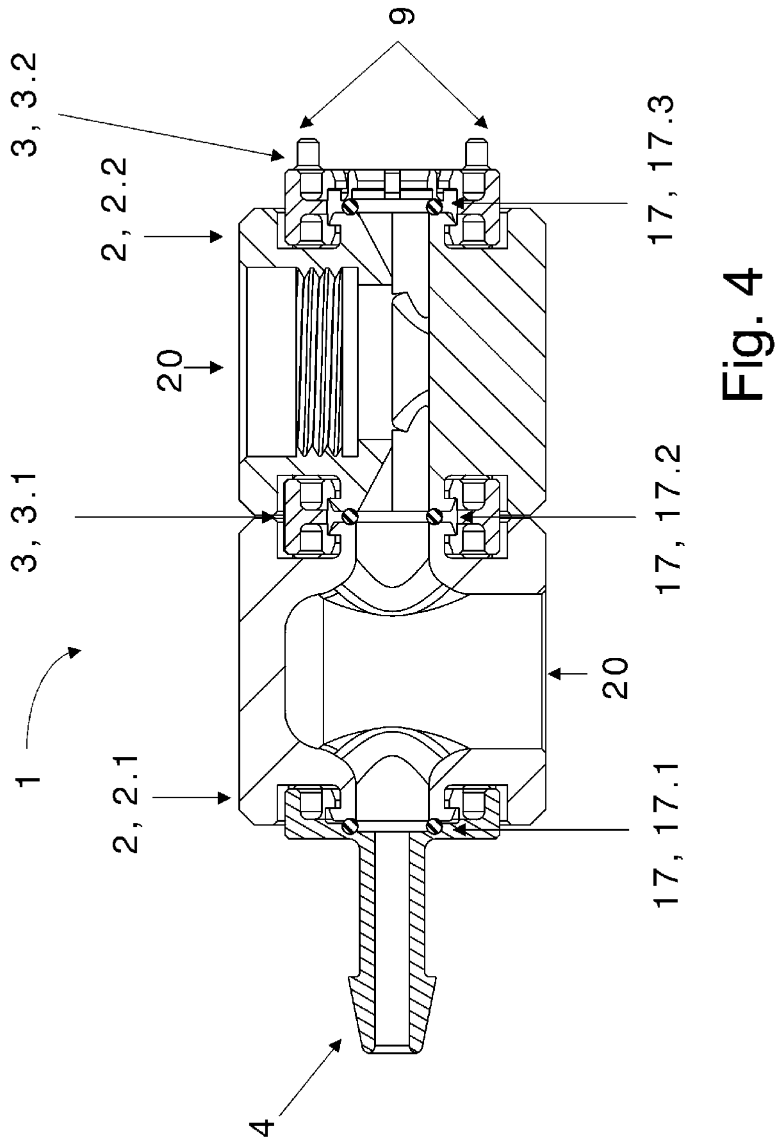
FIG. 4 shows a sectional view of an embodiment of a modular measuring cell.

FIG. 4 shows a sectional view of an assembly representation of an embodiment of a modular measuring cell 1, with which a first port 4 is latched to an arranged, first individual module 2, 2.1, wherein the connection between the individual module 2, 2.1 and the port 4 is additionally sealed with a sealing element 17, 17.1. The first individual module 2, 2.1 is connected via a latching to a first adapter 3, 3.1, which is latched to the second individual module 2, 2.2 on the opposite side. Between the individual modules 2.1 and 2.2, a sealing element 17.2 is arranged, which compresses and thus seals the latching between two individual modules provided by the adapter. The second individual module 2, 2.2 is latched on the opposite side to a second adapter 3, 3.2. The adapters 3, 3.1, 3.2 are designed with a sealing element 17.2, 17.2, 17.3 is designed as a one-piece two-component, three-component, or multi-component injection-molded part and which is configured to be compressed by a further individual element.

The two individual modules in each case have an opening 20 arranged perpendicularly to the main line channel for receiving a sensor, wherein the openings 20 are arranged on opposite sides.

Figure 5C:
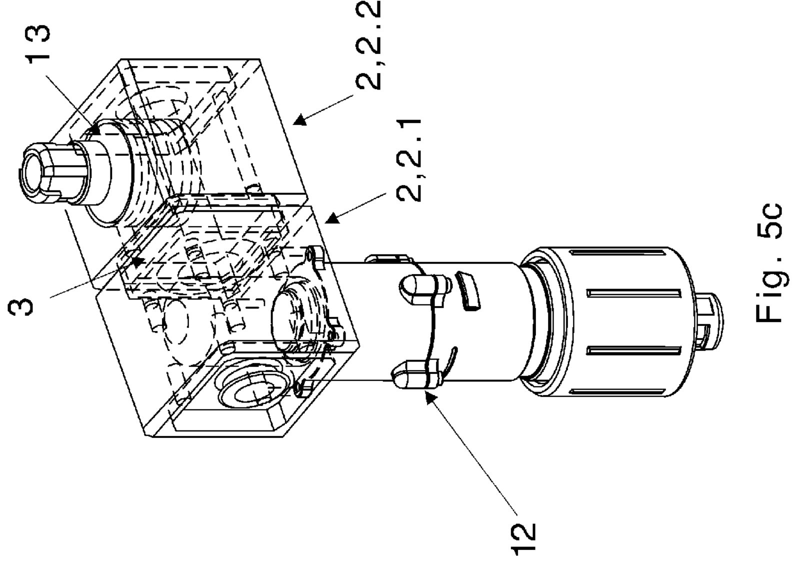
FIGS. 5*a*-5*c* show perspective views of: (a) an individual module with a conductivity sensor; (b) an assembly representation of two individual modules connected via an adapter, wherein one individual module has a conductivity sensor; (c) an assembly representation of a measuring system with two individual modules connected via an adapter, wherein a pH sensor is assigned to the first individual module, and a conductivity sensor is assigned to the second individual module.
Figure 5B:
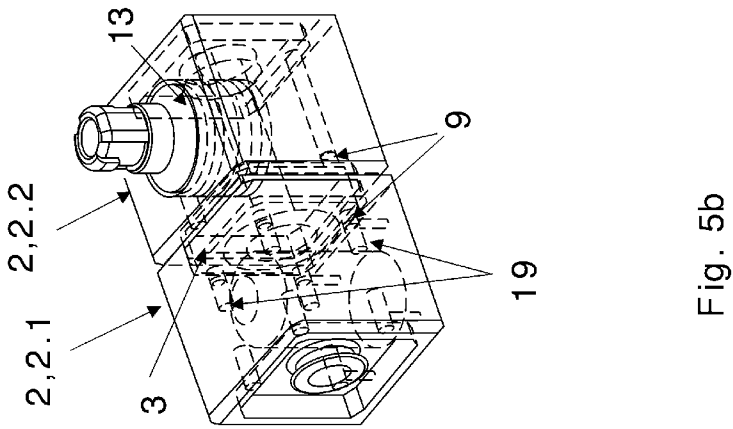
Figure 5A:
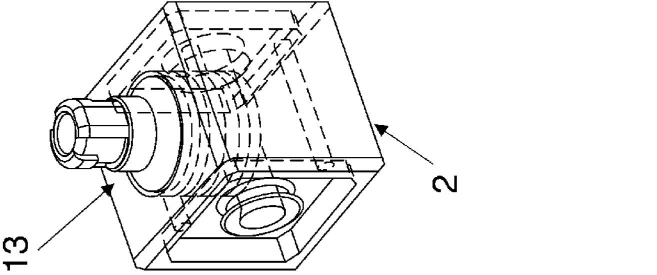

FIG. 5*a* shows an individual module 2, with which a conductivity sensor 13 is screwed on perpendicularly to the flow channel by means of the thread assigned to the sensor. FIG. 5*b* shows two individual modules 2, 2.1, 2.2. arranged next to one another, wherein a conductivity sensor 13 is screwed on perpendicularly to the flow channel in the case of an individual module 2, 2.2. FIG. 5*c* shows an embodiment of a measuring system with two individual modules 2 arranged next to one another, which are connected to one another via an adapter 3, wherein the second connecting elements or pins 9 on both outer surfaces of the adapter are received by the complementary first connecting elements or receiving indentations 19 of the individual elements to be connected. A pH sensor 12 is screwed onto the first individual module by means of four screws. A conductivity sensor 13 is assigned to the second individual module, wherein this sensor is screwed on by means of a thread of the sensor. The sensors are assigned vertically with respect to the main line channel and are in each case attached on opposite sides of the modular measuring cell.

Figures 6A, 6B:
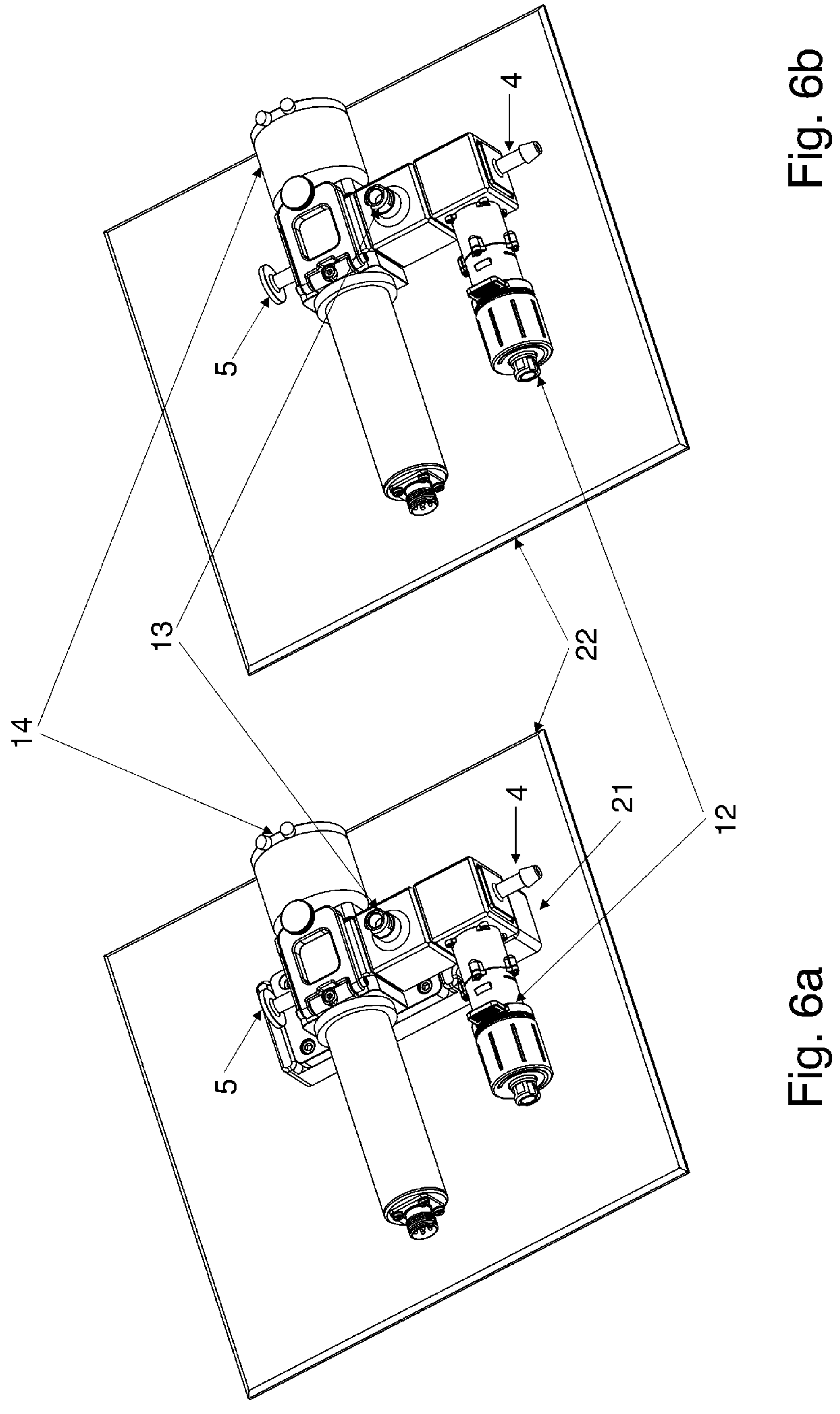
FIGS. 6*a* and 6*b* show perspective views of exemplary assemblies, each illustrating an embodiment of the modular measuring system according to the present disclosure mounted on a base support.

FIG. 6*a* shows a top view of an embodiment of a modular measuring system 11 that is latched or clamped onto a mounting element 21, which is mounted on a base support 22. FIG. 6*b* shows the same embodiment of a modular measuring system 11 as in FIG. 6*a*, wherein the measuring system is mounted directly on a base support 22.

The invention claimed is:

1. A modular measuring cell for analytical technology in bioprocess analysis comprising two or more successively arranged and interconnected individual modules, wherein the individual modules are each:

configured as a flow-through measuring cell for a fluid including an inflow opening and an outflow opening, which are assigned to a first outer surface and a second outer surface of the individual module, respectively;

include a flow channel having a measuring chamber between the inflow and outflow openings;

include first connecting elements with an axisymmetrical arrangement on the first and second outer surfaces; and include at least one further opening configured to enable installation of a sensor in the measuring chamber, the sensor configured to measure chemical and/or physical properties of the fluid flowing through the measuring cell, wherein a uniform adapter is arranged between two successive individual modules, which adapter includes a fluid-connecting passage opening and is configured to connect the flow channels of the successive individual modules to form a main line channel, wherein the adapter includes a first outer surface and an opposing second outer surface, which include second connecting elements having an axisymmetrical arrangement, wherein the first and second connecting elements are complementary to each other, and wherein each individual module is configured to be connected with respect to an adjacent individual module by a predetermined number of orientations about an axis of symmetry.

2. The modular measuring cell according to claim 1, wherein:

the first outer surface of an individual module at an inflow-side end of the main line channel is configured to be connected to a first port;

the second outer surface of an individual module at an outflow-side end of the main line channel is configured to be connected to a second port, each connection in at least a liquid-tight or gas-tight manner;

wherein the first and second ports each include:

a first port element or a second port element, which is of the same or different configuration; and a uniform base element including a base surface which faces an outer surface of one of the individual modules and includes third connecting elements with an axially symmetric arrangement; and wherein the first connecting elements of each individual module and the third connecting elements of the base surface are complementary to each other.

3. The modular measuring cell according to claim 2, wherein the connection between two individual modules connected via the adapter and/or between an individual module and a first or second port element is non-detachable and form-fitting.

4. The modular measuring cell according to claim 2, wherein each individual module is connected to the adapter and/or the first or second port element via at least one of:

a form-fitting axial latching about a longitudinal axis of the measuring cell, which is enabled by one or more latching elements;

a fixation enabled by the first connecting elements with the second or third connecting elements; and an adhesive bond or a material connection by laser welding.

5. The modular measuring cell according to claim 4, wherein the measuring cell is mounted on a base support:

indirectly by a latching or clamping of the entire modular measuring cell, or of the individual modules thereof connected to each other via the adapters, to a mounting element, which extends over the longitudinal axis of the measuring cell, wherein the mounting element is mounted on the base support; or directly by direct screw attachment, indirect screw attachment, latching, or material bonding, wherein the mounting is enabled by external surfaces of the individual modules, adapters, and/or first and second ports, which are not assigned to a sensor or a flow-through opening.

6. The modular measuring cell according to claim 1, wherein the axis of symmetry is a longitudinal axis of the main line channel, the longitudinal axis of the measuring cell, or a median of an outer surface of the individual module or adapter.

7. The modular measuring cell according to claim 6, wherein the median of an outer surface of the individual module, adapter, or port is a mirror axis.

8. The modular measuring cell according to claim 6, wherein the longitudinal axis of the main line channel or the longitudinal axis of the measuring cell defines an axis of rotation, wherein the axis of rotation is a 2-fold, 3-fold, 4-fold, 5-fold, 6-fold, or 8-fold axis of rotation.

9. The modular measuring cell according to claim 8, wherein the axis of rotation is a 4-fold axis of rotation, and two individual modules connected via the adapter are capable of being oriented relative to each other by four positions, each position offset by 90°.

10. The modular measuring cell according to claim 9, wherein an overall form of each individual module, including the first and second outer surfaces, is configured in a cube-like or cuboid-like shape.

11. The modular measuring cell according to claim 1, comprising two, three, four, five, or six individual modules connected to each other, each adapted to measure a same or different chemical and/or physical properties.

12. The modular measuring cell according to claim 11, wherein the modular measuring cell consists essentially of three individual modules adapted to measure different chemical and/or physical properties.

13. The modular measuring cell according to claim 1, wherein the individual modules are configured to be connected to each other in any order.

14. The modular measuring cell according to claim 1, wherein the first and second outer surfaces of each individual module are oppositely arranged, and/or wherein the first and second outer surfaces are configured to be identical.

15. The modular measuring cell according to claim 1, wherein the sensor is selected from one of a pH sensor, conductivity sensor, pressure sensor, temperature sensor, and an optical sensor.

16. The modular measuring cell according to claim 1, wherein the sensor is selected from one of a pH sensor, a conductivity sensor, and an optical sensor.

17. The modular measuring cell according to claim 1, wherein each individual module is configured to enable the sensor to be oriented at an angle between 30° and 150° relative to a longitudinal axis of the flow channel of the individual module, and/or wherein each individual module is configured such that the sensor can be oriented perpendicular to the longitudinal axis of the flow channel of the individual module.

18. The modular measuring cell according to claim 1, wherein each individual module is configured to enable the sensor to be connected to the individual module by direct screwing in, indirect screwing in, latching, or material fixing, and/or wherein the connection between the sensor and the individual module cannot be removed.

19. The modular measuring cell according to claim 1, wherein the adapter includes a filter.

20. The modular measuring cell according to claim 1, wherein the individual modules, the adapter, and first and second ports connectable to the individual modules are configured for single use and are composed predominantly or substantially entirely of plastic, wherein the plastic is a radiation-resistant and/or hot steam-sterilizable plastic, or wherein the plastic is a biocompatible, radiation-resistant, and/or hot steam-sterilizable plastic.

21. The modular measuring cell according to claim 1, wherein the measuring chamber of each individual module is configured to provide optimized fluid flow for a respective sensor installed in the measuring chamber.

22. A measuring system for the analysis of chemical and/or physical properties of a fluid, the measuring system comprising:

a modular measuring cell according to claim 1; and at least two sensors configured to analyze a same or different chemical and/or physical properties of the fluid.

23. The measuring system according to claim 22, wherein each sensor is selected from a group consisting of a pressure sensor, a temperature sensor, a pH sensor, a conductivity sensor, and an optical sensor.

* * * * *